No. 669,973. Patented Mar. 19, 1901.
M. BARR.
PROCESS OF PRODUCING ENGRAVING MACHINE PATTERNS.
(Application filed Aug. 14, 1899.)
(No Model.)
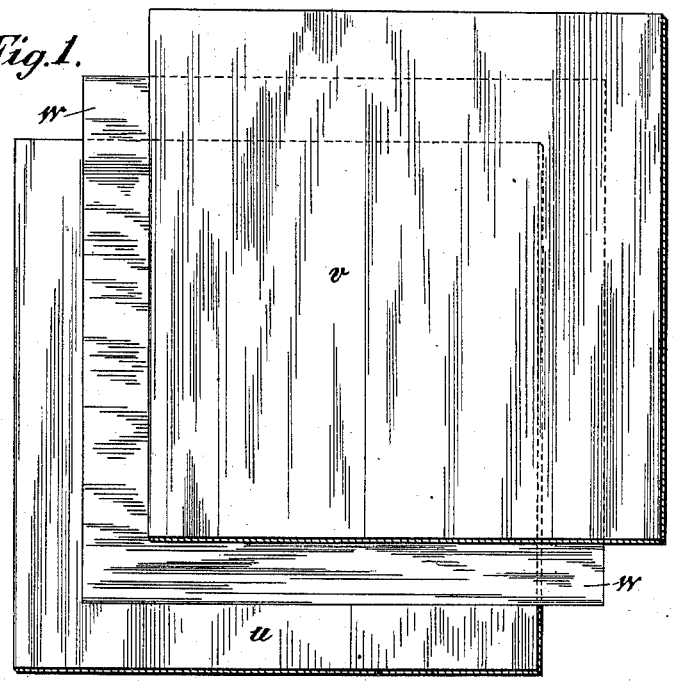
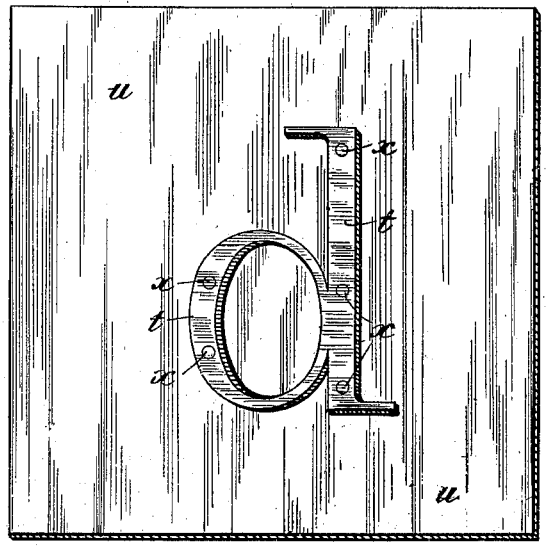
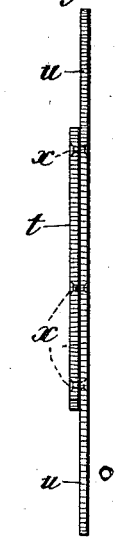
Witnesses
Robert E. McGreen
Harry L. Cot
Inventor
Mark Barr
per Chas. S. Woodroffe
Attorney.
THE NORRIS PETERS CO., PHOTO-LITHO., WASHINGTON, D. C.

UNITED STATES PATENT OFFICE.

MARK BARR, OF BROADHEATH, ENGLAND, ASSIGNOR TO THE LINOTYPE COMPANY, LIMITED, OF LONDON, ENGLAND.

PROCESS OF PRODUCING ENGRAVING-MACHINE PATTERNS.

SPECIFICATION forming part of Letters Patent No. 669,973, dated March 19, 1901.

Application filed August 14, 1899. Serial No. 727,136. (No specimens.)

*To all whom it may concern:*

Be it known that I, MARK BARR, of Broadheath, in the county of Chester, England, have invented a certain new and useful Process of Producing Engraving-Machine Patterns; and I do hereby declare the following to be a full, clear, and exact description of the invention, such as will enable others skilled in the art to which it appertains to make and use the same.

The present invention consists in an improved process for the production of engraving-machine patterns.

Referring to the accompanying figures, which are to be taken as part of this specification and read therewith, Figure 1 is a perspective view of the two metal plates and the foil; Fig. 2, a side elevation of the same two plates soldered together; Fig. 3, a perspective view of the finished pattern and the bottom plate to which it is held, and Fig. 4 a side elevation corresponding therewith.

$t$ is the pattern for use on the table of a pantograph or other engraving-machine under the tracer thereof. It is cut out of a metal plate along the proper outline and held fast upon a flat metal plate $u$ of a larger area, the pattern $t$ then standing cameowise or in bas-relief upon the larger plate $u$. Any suitable metal may be used for either plate. Hard-rolled brass gives satisfactory results. In carrying this invention into effect the top plate $v$, out of which the pattern $t$ is to be cut, is fastened down upon the plate $u$. For convenience the plate $v$ is of the same area as the plate $u$, as shown in Fig. 1. This fastening down is effected by means of a solder or other fusible adhesive material having a melting-point below that of the metal of the plates $u$ and $v$. The fastening agent is applied, preferably, in the form of a foil $w$, because it is easier to get the agent laid evenly over either plate when it is in that form than it is by spreading it over the said plate piecemeal, as by a soldering-bit or by a brush. The foil $w$ is of the same area as the plates $u$ $v$, as shown in Fig. 1. The term "foil" is hereinafter to be understood as including any solder or fusible adhesive material. The thickness of the foil $w$ may be as desired; but it is preferred that it should be as thin as is consistent with strong adhesion between the plates $u$ and $v$. The said foil having been placed between the two plates $u$ and $v$ with the edges of the three registering with each other, as indicated in Fig. 2, pressure and heat are applied to them simultaneously. The heat must be intense enough to melt the foil $w$. It is preferred that the two plates $u$ $v$ and foil $w$ shall be pressed together in a press and heat applied to them all three while they are in that position. The melting of the foil $w$, supplemented by the pressure, fastens the two plates $u$ and $v$ together. The plates $u$ and $v$ and foil $w$ are then cooled. If they had been raised to a high temperature, the cooling is effected at such a rate as will make the plate $v$ soft for being cut by the engraving-tool. The latter is set to cut through the plate $v$ and the foil $w$ and may be set to cut through them both and for a short distance into the plate $u$, it being guided in so cutting by the travel of the tracer over the original. When the cutting has been completed, the plates $v$ and $u$, still fast together and having the pattern $t$ separated from the rest of the plate $v$ by the groove made by the engraving-tool, are taken off the work-table of the engraving-machine and are further fixed together by means of rivets $x$, passed through them both, or by equivalent means. The foil $w$ is then melted, whereby the unriveted portions of the plate $v$ are detached from the plate $u$ and are removed, leaving the pattern $t$ in bas-relief thereupon, as illustrated in Figs. 3 and 4.

I claim—

The hereinbefore-described process for producing engraving-machine patterns, consisting of fastening two plates together by a foil pressure and heat; cutting a groove down through one according to the original; fixing the pattern to the bottom plate; and detaching the unfixed portions of the top plate from the bottom plate by melting the foil between them.

In testimony that I claim the foregoing as my invention I have signed my name in presence of two subscribing witnesses.

MARK BARR.

Witnesses:
C. W. CARPH,
H. A. WARNER.